United States Patent Office 2,918,492
Patented Dec. 22, 1959

2,918,492

METHOD OF PREPARING METHYL 2-KETOGLUCONATE

Robert J. Hathaway, Elkhart, Ind., assignor to Miles Laboratories, Inc., Elkhart, Ind., a corporation of Indiana No Drawing. Application August 24, 1956
Serial No. 605,958

2 Claims. (Cl. 260—483)

This invention relates to an improved method of producing the methyl ester of 2-ketogluconic acid

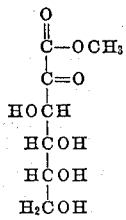

through the conversion of calcium 2-ketogluconate, the method being characterized by its simplicity of performance and by the great economy of reactants realized by virtue of the high yield of the ester. The invention is especially concerned with the production of the methyl ester of 2-ketogluconic acid from crude, relatively inexpensive sources of calcium 2-ketogluconate, such as the beer produced by fermenting with pseudomonas bacteria, with aeration, an aqueous solution of glucose containing enough calcium carbonate to neutralize the acids formed during fermentation.

It is therefore an object of the invention to provide a direct, efficient method of producing the methyl ester of 2-ketogluconic acid from calcium 2-ketogluconate, which method affords greater yields of the ester than may be obtained by prior art methods of which I am aware.

A further object is to provide a method of producing such ester in high yield and purity from impure calcium 2-ketogluconate.

A more particular object is to provide a method of producing methyl 2-ketogluconate from a crude beer resulting from the fermentation by pseudomonas bacteria of an aqueous solution of glucose in the presence of calcium carbonate.

An additional object is to provide a batchwise method of preparing methyl 2-ketogluconate, wherein the mother liquor of one batch operation is incorporated with the reactants of a subsequent batch operation, whereby the yield of ester in the subsequent operation is materially increased.

Other objects and advantages of the invention will become apparent from the description thereof which follows.

In accordance with a preferred procedure for carrying out the invention, calcium 2-ketogluconate trihydrate is reacted with an equivalent amount of dilute aqueous sulphuric acid, whereby 2-ketogluconic acid is substantially completely liberated from the calcium salt, and a precipitate of calcium sulphate is formed which may be easily removed from the medium by filtration. The precipitate is preferably washed with warm water to recover the entrained 2-ketogluconic acid, and the washings added to the filtrate which is then concentrated under vacuum at a moderately elevated temperature until the water content is reduced to about 15%. The concentrate is then refluxed with methanol to produce a precipitate of methyl 2-ketogluconate which, after cooling, is recovered from the mother liquor by filtration. Preferably, a catalytic quantity (e.g., about 1.0–2.0% of the weight of the methanol) of a strong acid, such as sulphuric acid, is employed in the esterification step to accelerate the rate of formation of the ester. The methyl 2-ketogluconate is then preferably washed with methanol and air dried at mild elevated temperature, e.g., 60°–70° C.

Various modifications in this procedure may, of course, be made without departing from the spirit of the invention. Other acids, such as oxalic acid, the anions of which will form insoluble precipitates with the metal portions of the said keto-acid salts, may be used to liberate the 2-ketogluconic acid. It will also be understood that other strong acids, such as hydrochloric acid, toluene sulfonic acid, or trichloracetic acid, or a strong cation exchange resin, may be substituted for the sulphuric acid as the esterification catalyst. The amount of acid catalyst used for the esterification in any given case is well within the skill of the art, the range of 1.0–2.0% set forth above being merely illustrative of a suitable catalyst concentration under the recited conditions.

In order to utilize to the fullest extent the reactants which go to make up the methyl 2-ketogluconate, I prefer to practice my invention by conducting a series of batch operations, each of which employs the basic method outlined in the preceding paragraph, and using in one such operation the mother liquor and methanol washings, if any, resulting from another such batch operation. For example, at least a portion of the mother liquor, from which the alcohol has been removed, remaining after precipitation of the methyl 2-ketogluconate produced in one batch may be joined with the ingredients of another batch prior to completion of liberation of the 2-ketogluconic acid from its salt in the latter batch, thereby appreciably increasing the yield of ester in the latter batch. Also, if the methyl 2-ketogluconate produced in any given batch is washed with methanol, in accordance with the preferred procedure outlined above, at least a portion of the resulting methanol washings may be advantageously used for esterification of the keto-acid in another batch.

It is to be noted that when the acid used as the esterification catalyst does not decompose or boil off during the refluxing in the esterification step, substantially all of the acid catalyst will remain in the mother liquor after the ester has been filtered off, with only an insignificant amount of the acid being taken up by the methanol washings. In such cases, unless the acid used to catalyze the esterification contains an anion which will form an insoluble precipitate with the metal portion of the 2-ketogluconic acid salt from which the keto-acid is obtained, the addition of mother liquor obtained in one batch to the ingredients of a subsequent batch, prior to completion of liberation of the 2-ketogluconic acid from its salt in the subsequent batch, would result in the presence of excess strong acid in the liberated keto-acid solution, which might have the undesirable effect of decomposing some of the keto-acid, especially during concentration of the latter. In order to avoid this disadvantage, I prefer to use as an esterification catalyst an acid whose anion will form an insoluble precipitate with the metal portion of the keto-acid salt from which the 2-ketogluconic acid is derived, and, when mother liquors containing such an acid catalyst are mixed with the main body of acid for liberating the keto-acid from its salt in a subsequent batch, in accordance with the procedure described immediately above, I prefer to so adjust the amount of such main body of acid that the total of the latter, plus the acid contained in the reused mother liquor, is substantially equivalent to the keto-acid salt used in such subsequent batch. In this way, substantially all of the acid which is mixed with the keto-acid salt solution is consumed by forming a precipitate with the metal portion of the salt, so that practically none of the acid is carried over into the resulting solution of free 2-ketogluconic acid. Thus, with this procedure, if an acid esterification catalyst is desired to be used, it must be added to the esterification reactants of each batch.

It may also be desirable in some instances to harvest a second crop of the crystalline methyl 2-ketogluconate from the mother liquor. This is accomplished by concentration of the mother liquor to remove water (to about 15% water content) and agitation with fresh methanol. The overall yield may be increased from 5% to 8% in this fashion.

In practice, I prefer to use as the acid for catalyzing the esterification, the same acid which I use for liberating the keto-acid from its salt.

It will be apparent that by the continued re-use of the mother liquors in succeeding esterifications, as described above, various impurities introduced with the reactants will accumulate, and, accordingly, the degree of purity of the reactants is a factor which determines the number of times the mother liquors produced in a series of esterifications may be mixed respectively with subsequent esterification mixtures.

The following examples are illustrative of presently preferred procedures for carrying out the present invention.

Example I

Four hundred (400 g.) grams of calcium 2-ketogluconate trihydrate was dissolved in an equal weight of water and treated during one-half hour with stirring with a theoretical amount of concentrated sulphuric acid. After stirring for one additional hour at 30–35° C., the mixture was filtered and the resulting calcium sulphate cake washed with warm water. The washings were then added to the filtrate and the combined liquid concentrated in vacuum (about 15 mm. Hg abs.) at 40–50 C. to a thick syrup (e.g., about 15% water). Methanol (600 ml.) and 4 ml. of concentrated sulphuric acid were added to the syrup. The resulting solution was refluxed 4.5 hours with stirring, during which time the methyl ester precipitated as a white solid. The mixture was cooled to 15° C. and the ester filtered from the mother liquor, washed with 200 ml. of methanol and air-dried at 60–70° C. The yield of methyl 2-ketogluconate was 297 g. or 94%. Melting point (block)=173–177°, with decomposition. By concentrating the mother liquor with the removal of the water content thereof and the addition of fresh methanol, a second crop of the methyl ester may be obtained, thus improving the yield.

Example II

Four hundred (400 g.) grams of calcium 2-ketogluconate trihydrate were suspended in an equal weight of water. To this mixture was added the concentrated mother liquors from the esterification step of a previous batch (i.e., the mother liquor obtained in Example I). To the resulting mixture was added, with stirring, the theoretical amount of concentrated sulphuric acid, less the amount of acid present in the added mother liquors, the latter amount of acid having been added as an esterification catalyst in the previous batch. After stirring for about 1½ hours, the mixture was filtered and the resulting cake of calcium sulphate washed with warm water. These washings were added to the filtrate, and the combined liquids were concentrated in a vacuum at 40–50° C. to a thick syrup. Methanol (600 ml.) and 4 ml. of concentrated sulphuric acid were added to the syrup and the resulting mixture refluxed for about 4½ hours with stirring, during which time the methyl ester precipitated as a white solid. The mixture was then cooled to 15° C., and the ester filtered from the mother liquor, washed with 200 ml. of methanol and air dried at 60–70° C. The yield of the ester was about 99% of theory; melting point (block) 173–176° C., with decomposition.

A particularly desirable feature of the present invention is its adaptability to the production, in high yield, of methyl 2-ketogluconate from crude fermentation beers containing calcium 2-ketogluconate, such as the beer produced by the fermentation of glucose monohydrate solution by pseudomonas bacteria according to well known prior art procedures.

The following example illustrates the production of methyl 2-ketogluconate directly from the crude fermentation beer in accordance with my invention.

Example III

An aqueous solution containing about 12% of glucose monohydrate per 100 ml. and enough calcium carbonate to neutralize the acids formed during fermentation, and including small amounts of inorganic salts as nutrients, was inoculated with pseudomonas bacteria and aerated for about three days, according to the method which is known to the art, producing a beer containing 12.34 gms. anhydrous 2-ketogluconate per 100 ml. This yield represents 93.4% of theory.

Three liters of this crude fermentation beer was acidified with a theoretical amount of sulfuric acid, based on the calcium assay of the beer, resulting in the precipitation of calcium sulfate dihydrate, which was filtered and washed with water. The washings and filtrate were combined and the resulting solution concentrated by evaporation below 50° C. under 29 inches of vacuum, to remove as much water as possible. The resulting syrupy mixture was dissolved in 400 ml. of methanol, and, after the addition thereto of a catalytic amount (about 2 ml.) of concentrated sulfuric acid, was refluxed for about 4½ hours, during which time a white precipitate of the methyl ester was formed. The ester was separated by filtration from the mother liquor, washed with methanol, dried and weighed. Yield: 78% based on glucose monohydrate, melting point 173–175° C., with decomposition.

As in the process illustrated in Example II, the yield of methyl 2-ketogluconate in a subsequent conversion of a fermentation beer according to Example III may be increased significantly by incorporating in the beer the mother liquor produced in the esterification step of a previous batch.

Having thus described my invention, what I claim is:

1. In a batchwise method of preparing methyl 2-ketogluconate comprising reacting a solution of calcium 2-ketogluconate with an acid whose anion will form an insoluble precipitate with calcium to produce a solution of 2-ketogluconic acid and an insoluble precipitate, separating said 2-ketogluconic acid solution from said precipitate, concentrating said 2-ketogluconic acid solution, esterifying said concentrated 2-ketogluconic acid with methanol in the presence of a catalytic quantity of a strong acid whose anion will form an insoluble precipitate with calcium, and separating the methyl 2-ketogluconate resulting from said esterification from the mother liquor formed simultaneously therewith, the improvement which comprises adding at least a portion of the mother liquor from one of said batches, along with a quantity of an acid whose anion will form an insoluble precipitate with calcium, to the calcium 2-ketogluconate solution of another batch, said last-mentioned quantity of acid and the catalytic acid contained in said portion of mother liquor together being equivalent to the calcium 2-ketogluconate of said other batch, the methanol contained in said portion of mother liquor being removed therefrom prior to the addition of the mother liquor to said other batch.

2. In a batchwise method of preparing methyl 2-ketogluconate comprising reacting a solution of calcium 2-ketogluconate with sulfuric acid to produce a solution of 2-ketogluconic acid and a precipitate of calcium sulfate, separating said 2-ketogluconic acid solution from said precipitate, concentrating said 2-ketogluconic acid solution, esterifying said concentrated 2-ketogluconic acid with methanol in the presence of a catalytic quantity of sulfuric acid, and separating the methyl 2-ketogluconate resulting from said esterification from the mother liquor formed simultaneously therewith, the improvement which comprises adding at least a portion of the mother liquor from one of said batches, along with a quantity of sulfuric acid, to the calcium 2-ketogluconate solution of another batch, said last-mentioned quantity of acid and said catalytic acid contained in said portion of mother liquor together being equivalent to the calcium 2-ketogluconate of said other batch, the methanol contained in said portion of mother liquor being removed therefrom prior to the addition of the mother liquor to said other batch.

References Cited in the file of this patent

UNITED STATES PATENTS

| | | |
|---|---|---|
| 2,153,311 | Pasternack et al. | Apr. 4, 1939 |
| 2,188,777 | Pasternack et al. | Jan. 30, 1940 |
| 2,277,716 | Lockwood et al. | Mar. 31, 1942 |
| 2,708,676 | Baggett et al. | May 17, 1955 |

OTHER REFERENCES

Ohle et al.: Ber. Deut. Chem. 63 (1930), pp. 848–50.
Ohle: Ber. Deut. Chem. 70B (1937), 2153.